(12) United States Patent
Gabor et al.

(10) Patent No.: US 7,595,923 B2
(45) Date of Patent: Sep. 29, 2009

(54) OPTICAL HEAD AND MULTIPLEXING METHODS FOR REFLECTION TYPE HOLOGRAPHIC STORAGE USING SPATIAL FILTERING

(75) Inventors: Erdei Gabor, Budapest (HU); Laszlo Domjan, Budapest (HU); Gabor Szarvas, Budapest (HU); Pal Koppa, Veszprem (HU)

(73) Assignee: Thomson Licensing, Boulogne-Billancourt (FR)

( * ) Notice: Subject to any disclaimer, the term of this patent is extended or adjusted under 35 U.S.C. 154(b) by 294 days.

(21) Appl. No.: 11/630,017

(22) PCT Filed: Jun. 13, 2005

(86) PCT No.: PCT/EP2005/052710

§ 371 (c)(1),
(2), (4) Date: Dec. 18, 2006

(87) PCT Pub. No.: WO2006/003077

PCT Pub. Date: Jan. 12, 2006

(65) Prior Publication Data

US 2008/0037085 A1    Feb. 14, 2008

(30) Foreign Application Priority Data

Jun. 29, 2004    (HU) .................................. 0401338

(51) Int. Cl.
*G03H 1/16*    (2006.01)
*G03H 1/28*    (2006.01)

(52) U.S. Cl. ........................... 359/29; 359/24; 369/103

(58) Field of Classification Search ................... 359/22, 359/24, 29; 369/103
See application file for complete search history.

(56) References Cited

U.S. PATENT DOCUMENTS

| 3,834,786 | A | 9/1974 | Carlsen |
| 6,285,474 | B1 | 9/2001 | Kawano et al. |
| 6,710,292 | B2 | 3/2004 | Fukuchi et al. |
| 2002/0015376 | A1 | 2/2002 | Liu et al. |

FOREIGN PATENT DOCUMENTS

| EP | 1324322 | 7/2003 |
| EP | 1551011 | 7/2005 |
| WO | WO 2004/034387 | 4/2004 |
| WO | WO 2004/102541 | 11/2004 |

OTHER PUBLICATIONS

Search Report dated Sep. 28, 2005.

*Primary Examiner*—Alessandro Amari
(74) *Attorney, Agent, or Firm*—Robert D. Shedd; Jeffrey M. Navon

(57) ABSTRACT

The invention describes a collinear optical head for a reflection-type holographic recording medium, which is capable of obtaining an increased capacity. The optical head presented here allows for high capacity by combining holographic multiplexing methods, based on a shift and/or phase-coded reference beam, and/or scanned reference beam and/or angle and/or confocal addressing techniques. The parallel reading method and the format of the holographic recording medium ensure high-speed data transfer. Combined multiplexing is implemented in the system by means of a confocal optical arrangement that reduces crosstalk between adjacent holograms by filtering out object beams unintentionally reconstructed from non-addressed holograms.

9 Claims, 10 Drawing Sheets

US 7,595,923 B2

OPTICAL HEAD AND MULTIPLEXING METHODS FOR REFLECTION TYPE HOLOGRAPHIC STORAGE USING SPATIAL FILTERING

This application claims the benefit, under 35 U.S.C. § 365 of International Application PCT/EP05/052710, filed Jun. 13, 2005, which was published in accordance with PCT Article 21(2) on Jan. 12, 2006 in English and which claims the benefit of Hungarian patent application No. P0401338, filed Jun. 29, 2004.

TECHNICAL FIELD

The invention describes a new kind of collinear optical head for a reflection-type holographic disc, which is capable of obtaining a capacity of 200 to 800 Gbytes using a holographic disc of about 0.5-2 mm thickness and 120 mm diameter. The optical head presented here allows for high capacity by combining holographic multiplexing methods, based on a shift and/or phase-coded reference beam, and/or scanned reference beam and/or angle and/or confocal addressing techniques. The parallel reading method and the disc format ensure high-speed data transfer. Combined multiplexing is implemented in the system by means of a confocal optical arrangement that reduces crosstalk between adjacent holograms by filtering out object beams unintentionally reconstructed from non-addressed holograms. Using the proposed confocal arrangement, a hologram packing denser than that limited by Bragg-selectivity is achieved.

BACKGROUND ART

In a holographic data storage system there are three or four independent optical channels depending on the system architecture: recording and/or reading reference beams and recording and/or reading object beams with spatial light modulator (SLM) and detector. In simple laboratory systems these optical channels use different optical paths, they are spatially separated from each other: overlapping occurs only in the storage material. This requires a high number of imaging objectives, mirrors, prisms, which leads to large dimensions and the need to adjust and control the optical channels independently. The independent paths are sensitive to environmental vibration. If the system size, i.e. the number of optical elements, is to be reduced, then the optical paths for the independent optical channels have to be used partially in common. To achieve this, specially designed optical elements are needed for coupling-in the independent channels after the laser and for coupling-out the independent channels before the detectors. The beams coupled together can go through the same optical paths and use the same objectives, which yields a so-called collinear arrangement. This arrangement is insensitive to environmental effects like vibration, air turbulence, temperature changes etc. Consequently, for a practically applicable holographic data storage system a collinear optical arrangement is favorable. Coupling-in and -out of the essentially parallel reference and objects beams can either be solved spatially, on the basis of polarization, or by utilizing the different beam convergence angles (numerical aperture, NA).

From the point of view of practical applicability it is desirable to use reflection-type holographic media, where all the optical elements are arranged on the same side of the holographic disc. When using transmission-type holographic media, parts of the optical system are arranged on opposite sides of the holographic disc. In this case two servo systems are needed for the optics on both sides, and/or large and heavy mechanical elements to maintain the optical elements in correct position relative to the surface of the holographic disc and relative to the tracks on both sides of the holographic disc. On the other hand, using reflection-type holographic media much simpler and smaller servos and mechanical elements can be employed.

In document EP1065658 a collinear holographic arrangement with polarization coupling-in and -out is used, combined with CD/DVD-like servo systems. According to the disclosed solution the more or less parallel object and reference beams are each cut into two orthogonally polarized half-cones. The orthogonally polarized half-cone reference beams and object beams are coupled-in and -out based on their polarization using special polarization rotating elements and polarization sensitive beam splitters. Depending on the optical arrangement and the material sensitivity, the orthogonally polarized beams form at least two or more micro-holograms. From a geometrical point of view these micro-holograms are arranged beside each other. However, taking into account diffraction of the object and reference beams, the micro-holograms overlap each other, and also overlap the oppositely polarized reference beams. During the reading process this overlapping generates unwanted ghost images and reduces the signal-to-noise ratio (SNR) of the read image. Consequently, using the polarization collinear holographic optical setup presented in EP1065658 it is problematic to filter out unwanted ghost images. The solution according to the present invention avoids the ghost images generated by the direct and reflected reference beams.

It is a cost-effective idea to use the well-known CD/DVD-like servos for holographic media. In these digital optical storage systems a "single point" of the disc surface is written or read using servos having only three degrees of freedom. In holographic storage information is stored in a three-dimensional volume requiring servos having six degrees of freedom. This means that for recording and reading the reference beams must be adjusted to the hologram in six degrees of freedom: for holographic storage it is not feasible to use the well-known track and focus servos. Depending on the optical system, due to the large NA of the reference and/or object beam additional servos must be introduced for tilt compensation of the holographic disc or the reference beam. EP1065658 does not describe any solution for compensating the tilting errors.

In a holographic system there is an object-image relation between the SLM and the detector array, and the "distance" between them is finite. In CD/DVD/HD-DVD/Blu-Ray systems the focusing objective is illuminated by a "plane wave" so the object and the image are at essentially infinite distances from each other, which is called infinite-conjugate imaging. In this case the coaxial movement of the objective during focus error compensation does not cause a blur of the imaged focus spot. In holographic systems the simple CD-like focus servo causes a blur because of the finite distance between object and image. In EP1065658 there is no solution for the compensation of the blur caused by movements of the objective during the focusing. The present invention suggests a technically viable solution to compensate for the movements of the imaging objective of a holographic storage system.

SUMMARY OF THE INVENTION

The present invention consists in a collinear optical arrangement for recording and reading holograms on/from reflection type holographic media with volumetric storage material. The recording/reading head includes an optical system, which for recording generates an object and a reference beam interacting on a holographic medium, and which for reading generates a reference beam to reconstruct a hologram to retrieve information from the holographic medium. The optical system is a 12f reflection type system, consisting of three pairs of different objectives. The first objective in each of the objective pairs generates the Fourier transform of the object SLM, which is inverse transformed by the respective second objective. Thus, the image of the object is always created in the back focal plane of the second objective of each objective pair. The entire 12f system has three dedicated planes in confocal arrangement in which the Fourier transform of the object SLM is formed. The holograms are recorded near to the central dedicated plane. At this central dedicated plane the reflective layer of a holographic medium is located to realize the reflection type working mode. The optical axis of the reflection type 12f system is orthogonal to the reflective layer of the holographic medium. In the two outer dedicated planes there are spatial filters having a special form and size. The reference beam is coupled-in and/or -out to the object beam at these two outer confocal dedicated planes. The 12f reflection type collinear optical system allows to use combined multiplexing methods: shift and/or phase-coded reference beams, a scanned reference beam, angle and/or confocal multiplexing techniques. Combined multiplexing is implemented in the system by means of a confocal optical arrangement that reduces crosstalk between adjacent holograms by filtering out object beams unintentionally reconstructed from non-addressed holograms. Using the proposed confocal arrangement, denser hologram packing can be achieved than that is limited essentially by Bragg-selectivity. The reconstructed object beams coming from non-addressed holograms are spatially separated at the Fourier plane (one of the outer dedicated planes) from the object beam coming from the addressed hologram. The addressed hologram and the spatial filter are arranged in a confocal optical system (they are object and image of each other). At each position of the storage material several holograms are multiplexed with good Bragg selectivity, too. During the reading process, the hologram addressing is achieved employing Bragg selection and confocal filtering in parallel.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
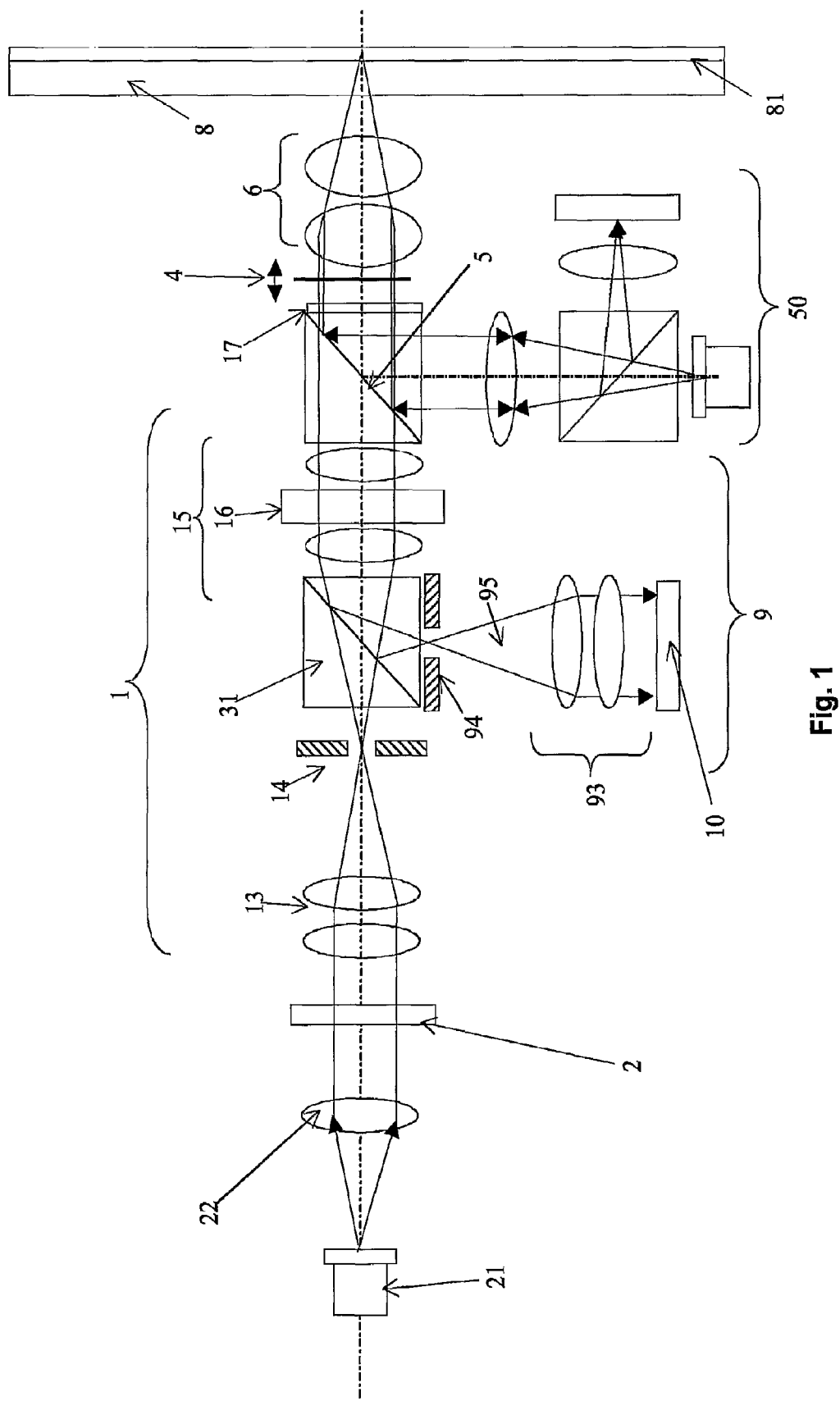
FIG. 1 shows the optical layout for the object beams of the 12f reflection type optical system.

FIG. 1 shows the optical layout of the object beams for the 12f reflection type optical system from the laser to the detector. In FIG. 1 the reference beams are not shown. The input data are written with a transmission type SLM. It is likewise possible to use a reflection type SLM. In both cases an amplitude or phase SLM can be employed.

The main elements in FIG. 1 are as follows: First Fourier objective pair 1: recording long focal length relay objective; Spatial light modulator (SLM) 2; Intermediate image plane (this moves together with the high NA Fourier objective 6) 4; Wavelength selective beam splitter (for coupling-in and -out a servo light beam) 5; Second Fourier objective pair 6: folded objective pair, high NA Fourier objective; Holographic storage medium 8; Third Fourier objective pair 9: reading long focal length relay objective; Detector array 10; Lenses of the recording relay objective 13; First Fourier plane (with a recording Fourier filter 14); Variable focal length inverse Fourier objective 15; Liquid crystal (LC) lens 16; quarter wave plate 17; Laser diode 21; Laser diode collimator 22; Polarization sensitive beam splitter (prism for coupling-in and -out for separation of recording and reading beams) 31; CD/DVD type focus and track servo optics 50; Lenses of the reading relay objective 93; Third Fourier plane (with a reading Fourier filter (confocal filter) 94); Reading object beam 95; Optics for the servo light beam 50.

The variable focal length inverse Fourier objective 15 with the LC lens 16 is a common part of both the recording long focal length relay objective 1 and the reading long focal length relay objective 9. In the collinear 12f optical system there is an SLM 2 for writing the data, which is located in the first focal plane of the first objective pair 1. In the common focal plane (first Fourier plane) of the first objective pair 1 there is a specially shaped spatial filter aperture 14. This aperture 14 cuts out the higher order components of the Fourier transform of the SLM 2. The special shape of the aperture 14 allows the coupling-in and -out of the object and reference beams. In the back focal plane of the first objective pair 1 an image of the SLM (already spatially low-pass filtered) appears. The filtering increases the data density.

The first focal plane of the first member of the second objective pair 6 coincides with the last focal plane of the second member of the first objective pair 1, in which plane the low-pass filtered image of the SLM 2 is located. This is the intermediate image plane 4. This intermediate image 4 is Fourier transformed by the first member of the second objective pair 6 into the common focal plane of the two objectives. This is the second Fourier plane. The second objective pair 6 is a folded objective. At the inner Fourier plane of the second folded objective pair (in the second Fourier plane) the reflective layer 81 of the holographic medium 8 is located. The holographic medium 8 is in or near the common focal plane of the second objective pair 6 where the object beam intersects the reference beam or beams. The first focal plane of the third objective pair 9 coincides with the back focal plane of the second objective pair 6, in which plane the spatially filtered reconstructed image of the SLM 2 is located. This image is further Fourier transformed by the third objective pair 9 into the common internal focal plane of the objective pair elements, where the second specially shaped spatial filter 94 is located. The second member 93 of the third objective pair 9 again generates the filtered image of the SLM 2 in the back focal plane of the complete system, where the detector array 10 is located. The first Fourier plane (the inner common focal plane of the first objective pair 1) is imaged into the inner common focal plane of the second objective pair 6, from where it is re-imaged into the inner common focal plane of the third objective pair 9. The three inner focal planes (Fourier planes) are hence all images of each other, i.e. the Fourier planes are in confocal arrangement.

Servo signals are generated in the system using a servo light beam having a significantly different wavelength of light than that of the object and reference beams. This ensures a reliable separation between these light beams. Usually a longer wavelength is used for the servo light beam. In the following, for simplicity the servo light beam will be referred to as servo beam, while the object and reference beams will be referred to as holographic beams. In the 12f optical system, just before the second objective pair 6 there is an additional wavelength selective beam splitter 5 for coupling-in and -out the servo beam. The servo beam coming from the standard CD/DVD type servo optics 50 is reflected by the splitting surface of the wavelength selective beam splitter 5, while the holographic beams pass through it. Using the servo beam the focusing and tracking errors can be determined just as for a CD/DVD type disk. The focus error compensation causes a shift of the intermediate image plane 4 together with the high NA Fourier objective 6. This leads to a defocusing on the detector array 10. To eliminate this, the variable focal length Fourier objective 15 compensates the shift of the intermediate image plane 4. The electrically controllable component of the variable focal length Fourier objective 15 is a LC lens 16. The LC lens 16 receives its control signal for example from the current of a voice-coil (not shown) of the focus servo system. With the variable focal length Fourier objective 15 a sharp image of the SLM 2 is achieved in the shifting intermediate image plane 4. Consequently, a sharp image on the surface of the detector array 10 is created.

The SLM 2 can be either an amplitude- or phase-only modulation SLM. The suggested 12f optical system is appropriate for data storage using the phase-contrast method. In this method, during recording the object beam is modulated with phase-only binary pixels with zero or $\pi$ phase-shift, which is however not readily detectable. Correspondingly, during reading of the information, a phase shifting element needs to be placed in the third Fourier plane that superimposes a $\pi$ phase shift to the zero order component of the Fourier-spectrum of the object beam. In this way the phase information of the object beam can be converted into an already detectable intensity distribution on the surface of the detector array 10., as is well-known from phase-contrast microscopy.

Figure 2:
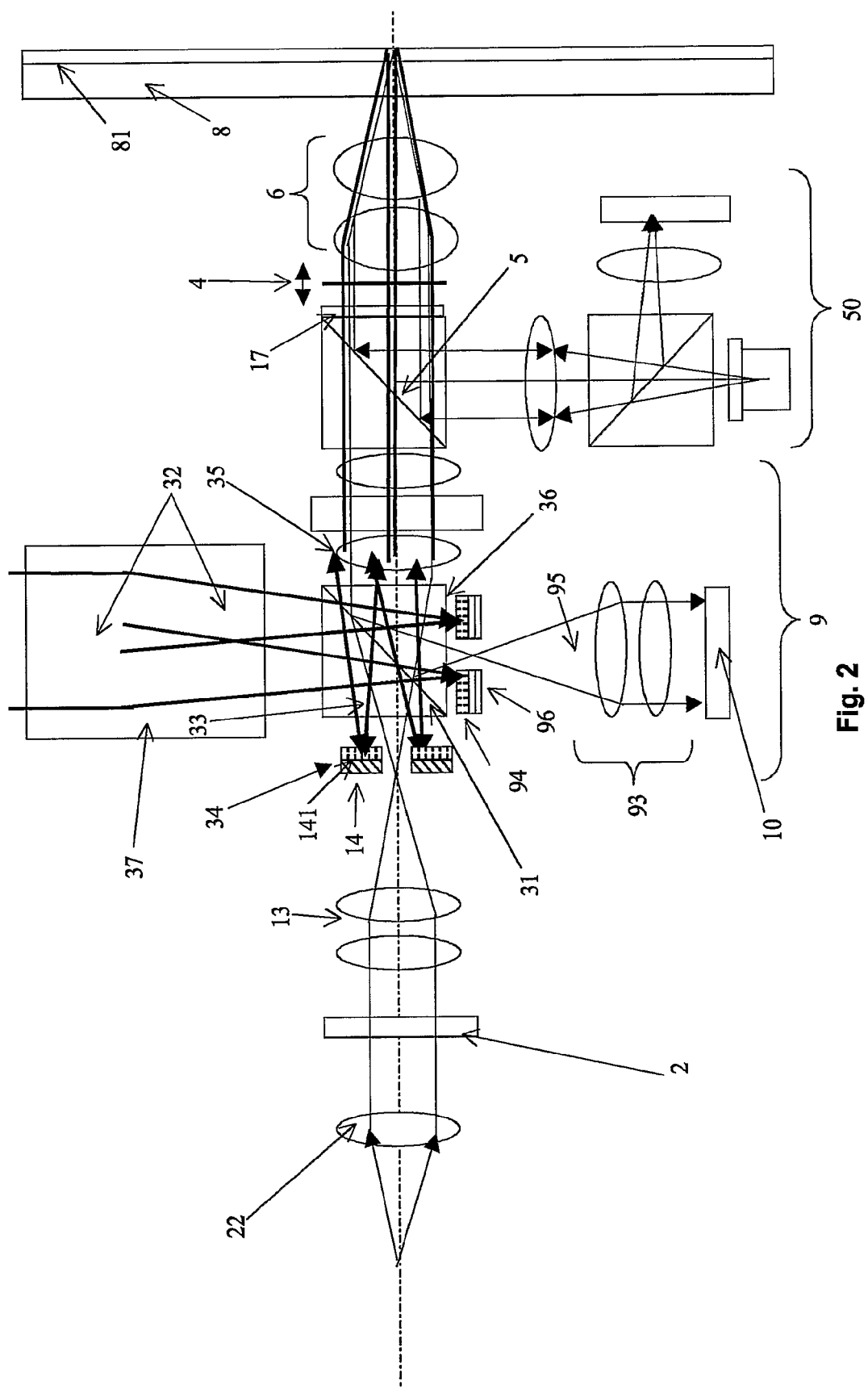
FIG. 2 shows the coupling-in of the reference beam at the first Fourier plane of the object beam, and the coupling-out at the third Fourier plane.
Figure 8:
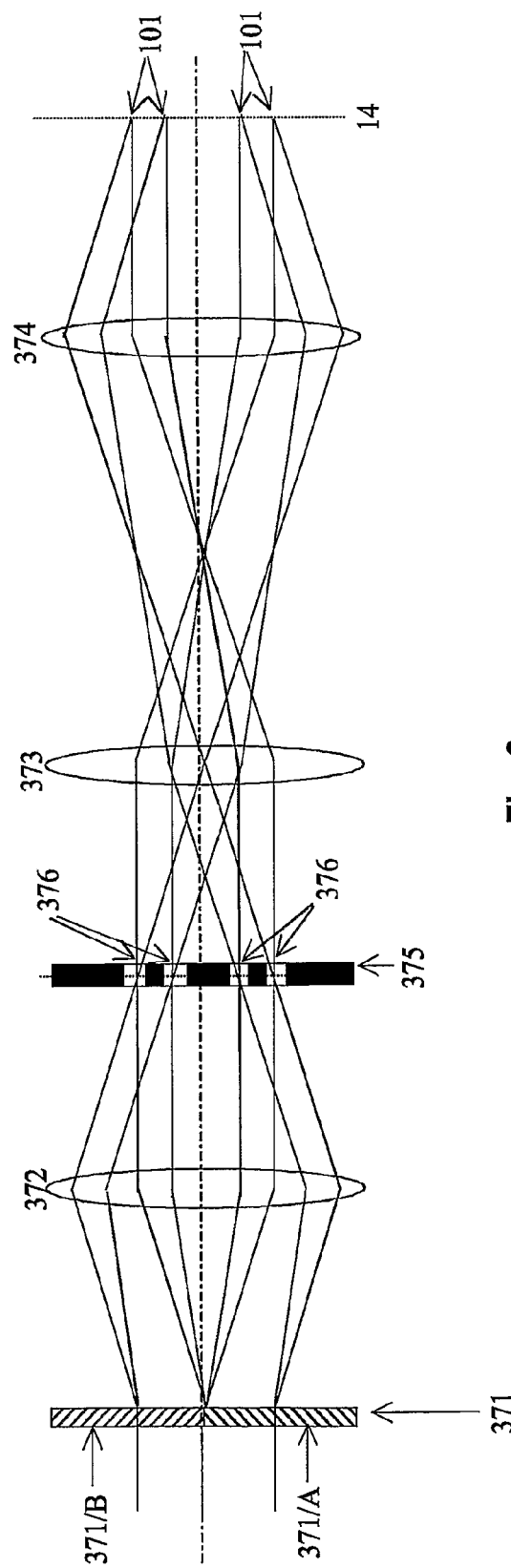
FIG. 8 shows a preferred embodiment of a reference beam generator for a one-dimensional array of high NA half-cone reference beams.

FIG. 2 shows how the reference beam 32 is coupled-in to the object beam at the first Fourier plane of the object beam, and how it is coupled-out at the third Fourier plane. The reference beam or beams 32 arriving from the laser (not shown) pass(es) through a beam forming optics 37 and the polarization sensitive beam splitter 31. In FIG. 2 the beam forming optics 37 is drawn only schematically, details are shown in FIG. 8. The polarization sensitive beam splitter 31 reflects the reference beam or beams 33 towards the backside 141 of the recording Fourier filter 14. This filter has two purposes. First, with an opaque mask it low-pass filters the object beam during recording. Second, the backside 141 has a specially shaped reflective area, covered by a quarter wave plate 34. The reference beam or beams 35 are reflected by this mirrored surface of the recording Fourier filter 14. The reference beam or beams 35 travel(s) from the recording Fourier filter 14 to the holographic medium 8 and towards the reading Fourier filter 94 through the same optical elements as the object beam. The object and reference beams 35 travel in a collinear manner along this path. The reading Fourier filter 94 stops the reflected reference beam or beams 36. Behind the reading Fourier filter 94 there is a special detector array 96 and/or a Shack-Hartman sensor to measure the positions of the reflected reference beams 36. From this position information the amount of tilt of the holographic medium 8 can be determined, which is a necessary condition for tilt compensation.

Figure 10:
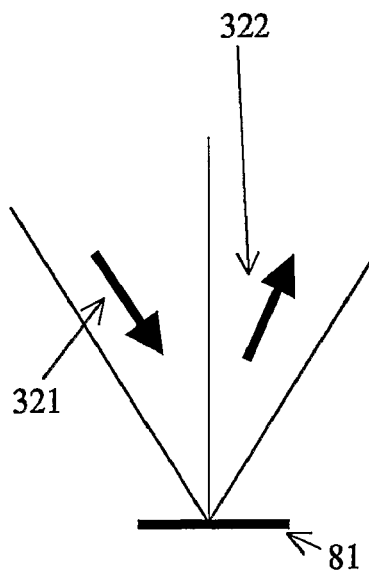
FIG. 10 shows a reference beam cone.

Depending on the multiplexing methods applied, the reference beams 32 can be spherical or plane waves. At shift multiplexing spherical reference beams are used to achieve a good Bragg selectivity. To avoid ghost images resulting from phase-conjugate hologram reconstruction, half cone-shaped spherical reference beams 321 and 322 are favorably used (see FIG. 10). The focal point of the spherical reference beam or beams is on the mirror surface 81 of the holographic medium 8. The incident half-cone beam 321 and the reflected half-cone beam 322 together constitute an entire cone without realizing phase-conjugate reconstruction, which would otherwise disturb reading of the stored data. For other types of multiplexing either spherical or plane reference beams can be used as well.

Figure 3:
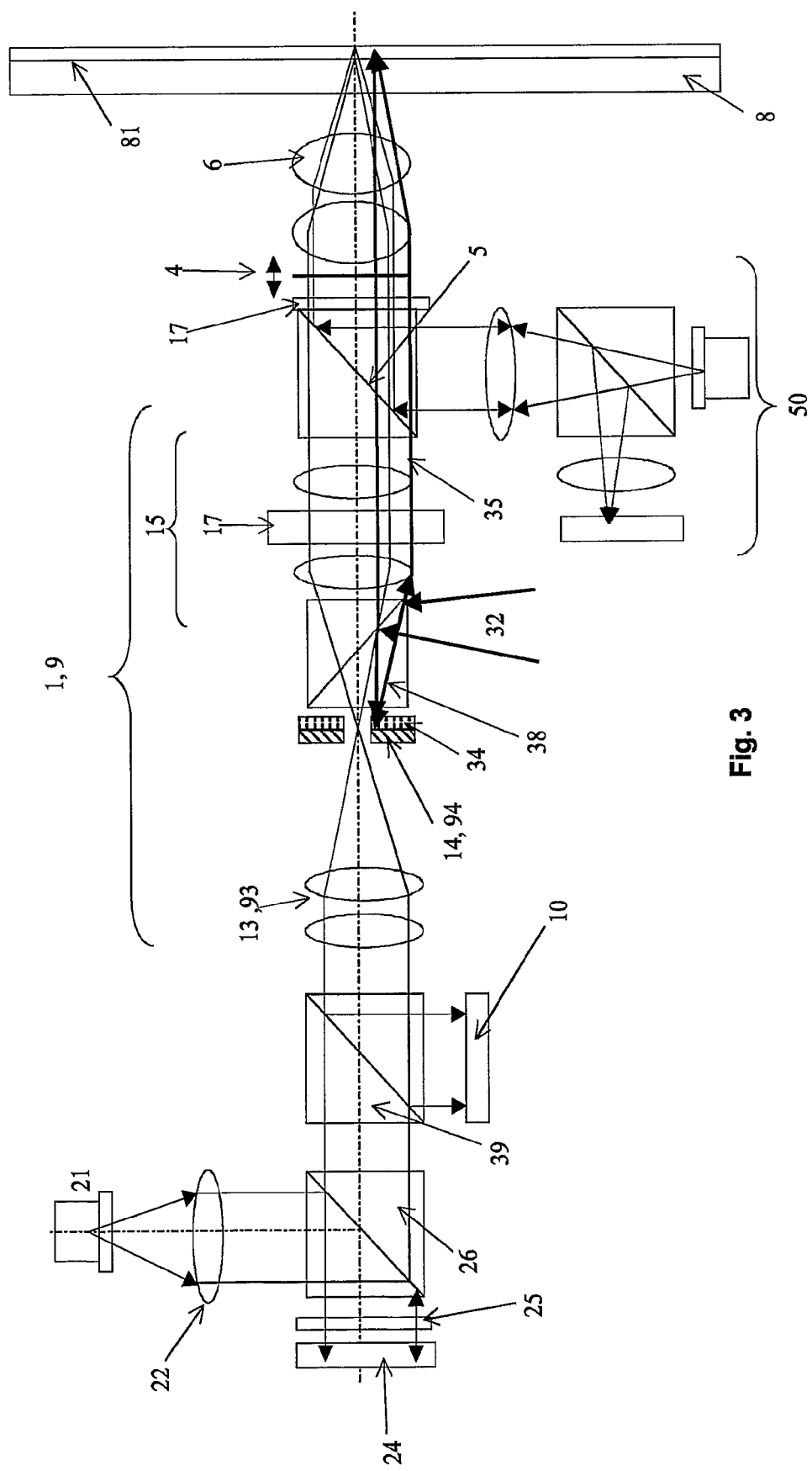
FIG. 3 shows another embodiment of the optical layout for the object beams for the 12f reflection type optical system.

FIG. 3 shows another embodiment of the optical layout for the 12f reflection type optical system. The beam path of the object beams from the SLM 24 to the detector 10 is shown. The main differences between the embodiments in FIG. 1 and FIG. 3 are as follows. In FIG. 3 the reflection type SLM 24 writes the data into the object beam through a polarization beam splitter 26 and a quarter wave plate 25. All the elements of the first Fourier objective pair 1 (recording long focal length relay objective) and the third Fourier objective pair 9 (reading long focal length relay objective) are the same in the embodiment of FIG. 3. In FIG. 1 only a part of the recording and reading long focal length objectives is common, i.e. the common path of the object and reference beams is longer in FIG. 3 than in FIG. 1. The object and the reference beams are coupled-in and -out with the polarization beam splitter 38, and the recording object beam is separated from the reading object beam with a further polarization beam splitter 39. The arrangement of FIG. 3 is less sensitive to disturbances, air turbulences, etc. However, with the arrangement shown in FIG. 1 different magnification ratios between the SLM 2 and the detector 10 can be realized.

Figure 4:
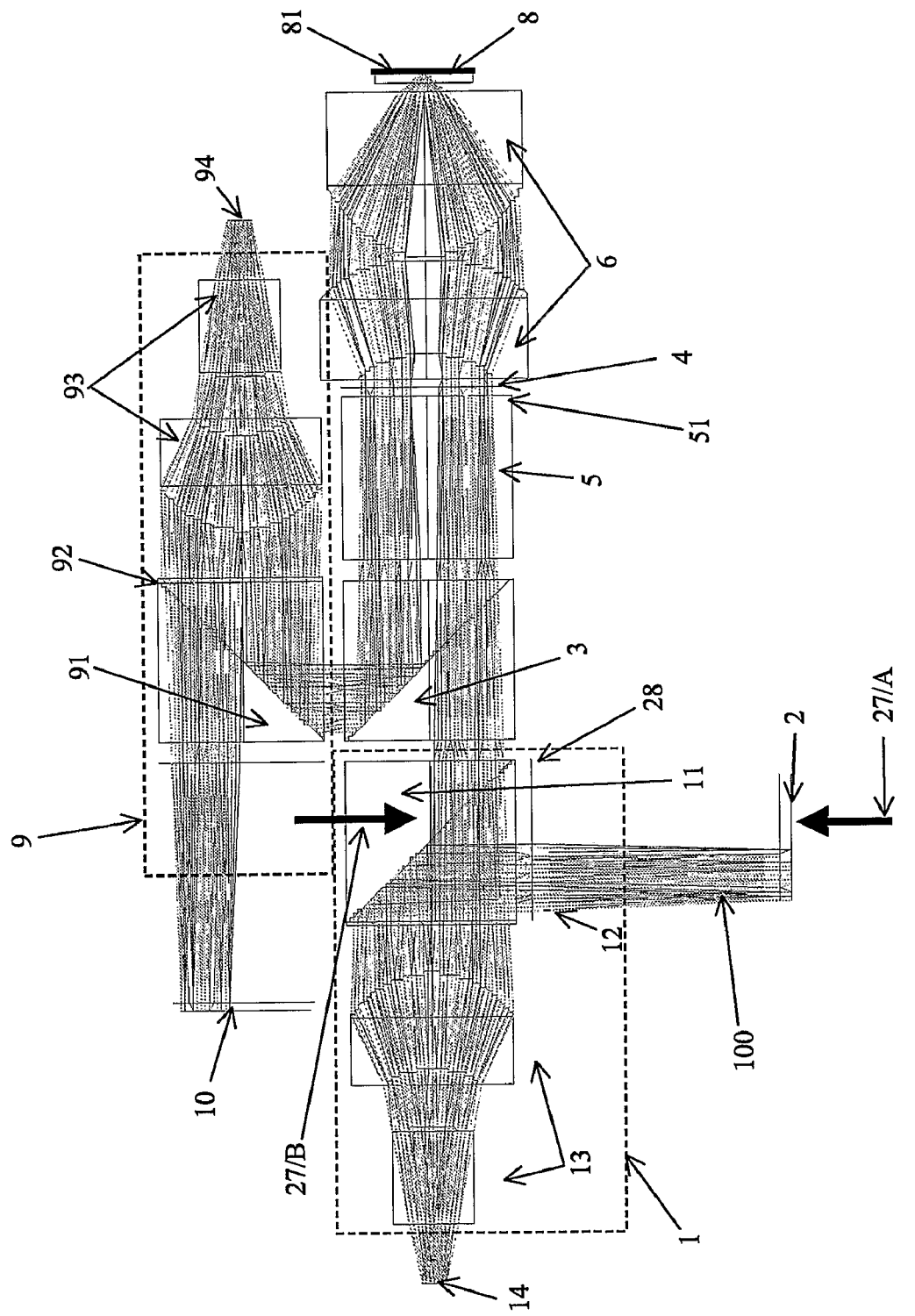
FIG. 4 shows the optical layout for the object beams of a folded 12f reflection type optical system.

FIG. 4 shows the optical layout for the object beams of a folded 12f reflection type optical system from the SLM 2 to the detector array 10. The input data are written with either a transmission type or a reflection type SLM 2. Depending on the type of the SLM 2 applied, the illumination beam 27/A or 27/B either passes trough the polarization beam splitter 11 and the quarter wave plate 28, or illuminates the SLM 2 directly. FIG. 4 does not show the reference beam or beams. Through the polarization beam splitter prism 11, the folded recording relay objective 1 generates an essentially distortion-free, real image of the SLM 2 in the intermediate image plane 4. The Fourier objective 6 consisting of one or more spherical or aspheric lenses generates the Fourier transform of this real image of the SLM 2 on the reflective layer of the holographic medium 8. During hologram reconstruction, the reading object beam is reflected by the reflective layer 81 of the data carrier 8, and then propagates through the reading/recording Fourier objective 6. The real image of the SLM 2, i.e. the reconstructed data, is generated on the intermediate image plane 4. A quarter wave plate 51 transforms the reading object beam into a beam with linear polarization normal to the polarization state of the recording beam, so that it can reach the folded reading relay objective 9 via a polarization beam splitting prism 3. The read image is then created on the surface of the detector array 10 by the folded reading relay objective 9.

The folded recording relay objective 1 consists of a polarization beam splitter prism 11, a quarter wave plate 12, lenses 13 and a reflective spatial filter 14. In the plane of the reflective spatial filter 14, the lenses 13 generate the Fourier transform of the SLM 2. The reflective spatial filter 14 is a mirror with an aperture of given size and shape. The folded reading relay objective 9 consists of a polarization beam splitter prism 91, a quarter wave plate 92, a lens 93 and a reflective spatial filter 94. The lens 93 generates the Fourier transform of the inner image plane 4 in the plane of the reflective spatial filter 94. The reflective spatial filter 94 is a mirror with an aperture of given size and shape, located confocally with the hologram currently addressed (being read).

Figure 5:
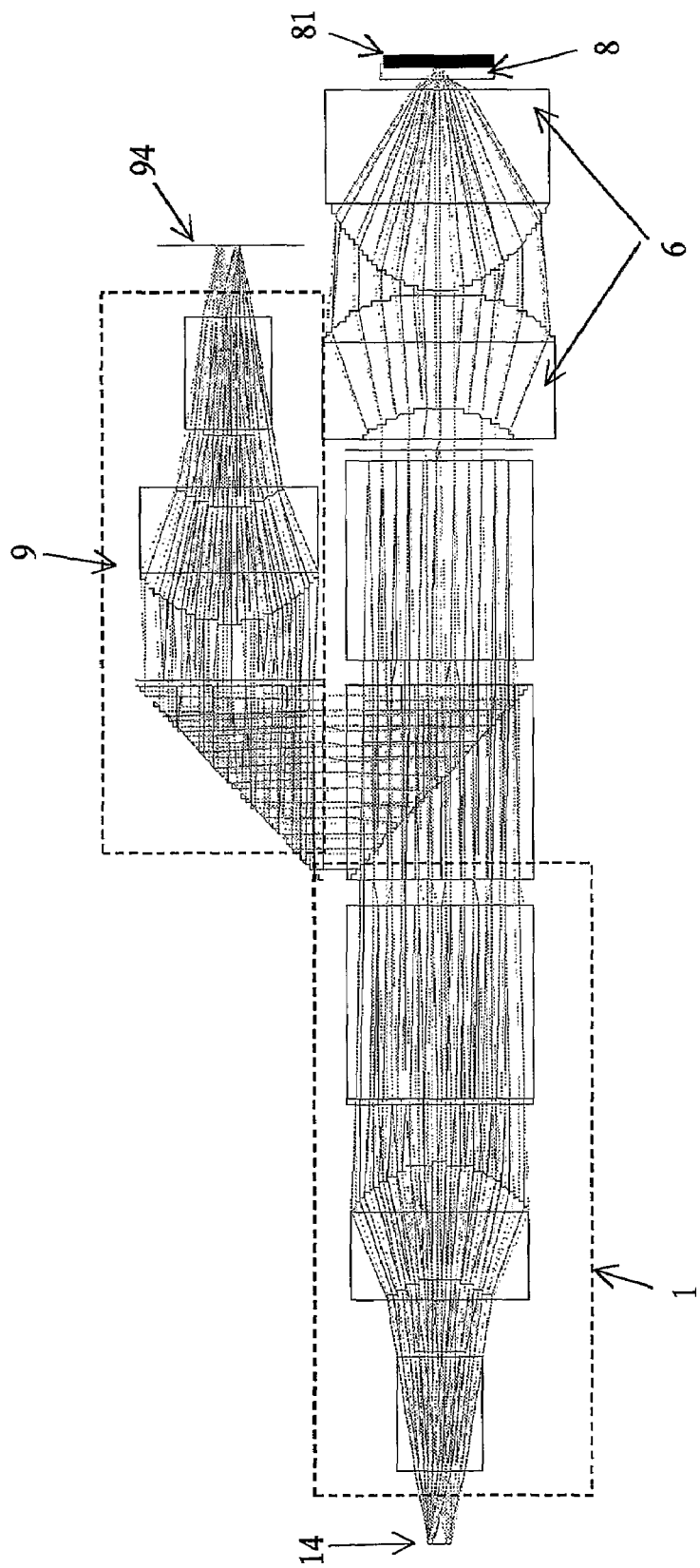
FIG. 5 shows the optical layout for the reference beam path of the folded 12f reflection type optical system.

FIG. 5 shows the optical layout for the reference beam path of the folded reflection type 12f optical arrangement. The reference beam is coupled-in at the first Fourier plane of the object beam, and coupled-out at the third Fourier plane.

Figure 6:
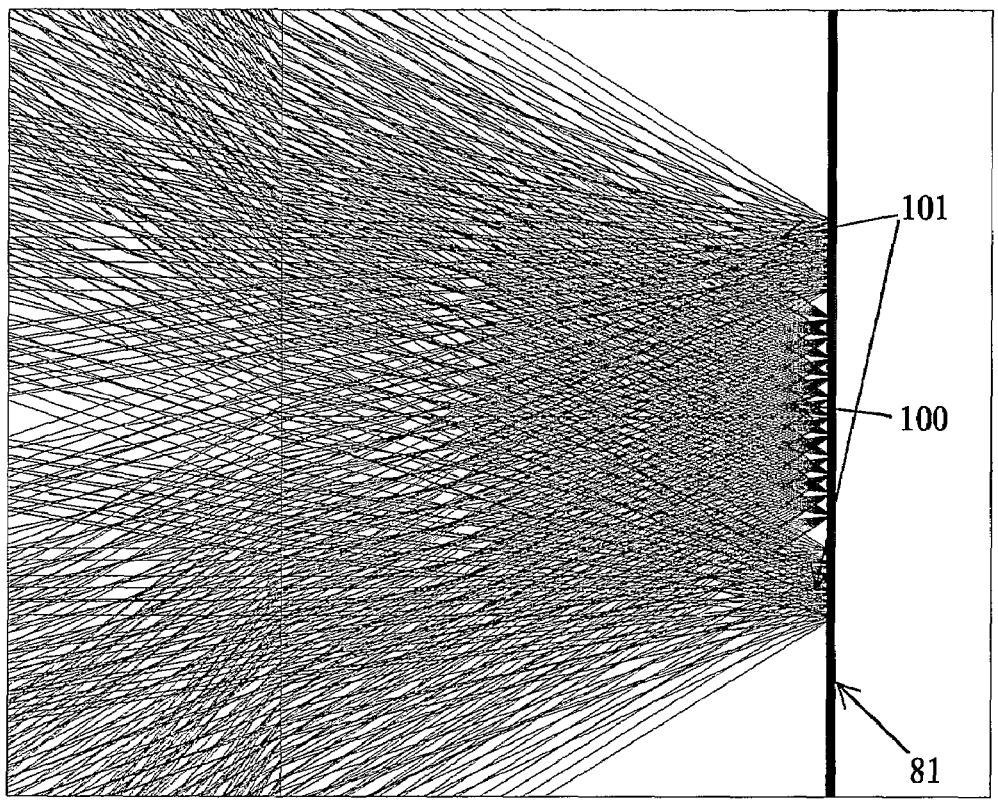
FIG. 6 shows the placing of the reference beam half-cone tips and the object beam Fourier transform at the Fourier planes of the 12f optical system.

FIG. 6 shows the object beam 100 and the reference beams 101 at the reflective layer 81 of the holographic medium 8. This figure shows that the object beam 100 and the reference beams 101 are entirely separated at the Fourier plane. This allows a partial overlap between the object and reference beams 100, 101 without causing any significant disturbance in any of them.

Figure 7:
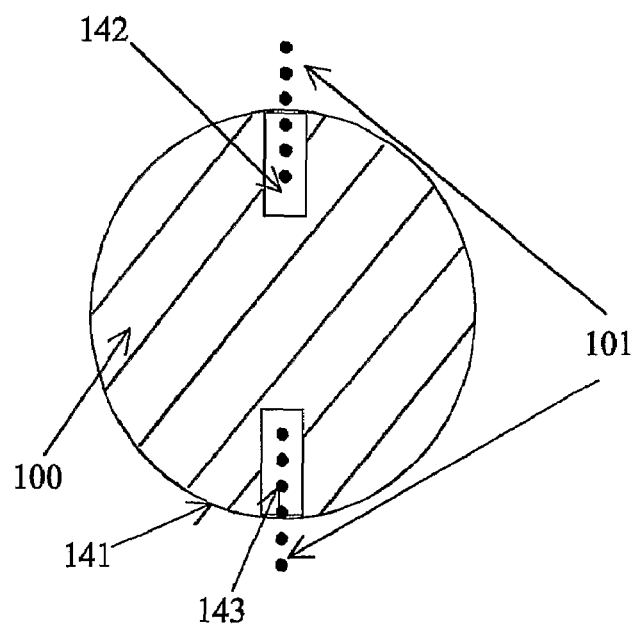
FIG. 7 shows the design of the spatial filters (or the confocal filter) applied at the first and third Fourier planes of the object beam.

FIG. 7 shows the spatial filter in the first Fourier plane 14. Here the reference beams 101 are coupled with the object beam 100 by the recording Fourier mirror 141. This mirror has a special shape: on opposite sides of the mirror aperture there are two non-reflecting, transparent rectangular areas 142, 143 for coupling-in the reference beams 101. The circular shape of the recording Fourier mirror 141 low-pass filters the object beam 100 by cutting off specific Fourier components. The reference beams 101 go through the non-reflective areas 142, 143 and the object beam 100 is reflected on the recording Fourier mirror 141. With an appropriate selection of the size of the Fourier mirror 141, the size of the rectangular areas 142, 143, and the length of the line formed by the spots of the reference beams 101, the total system storage capacity can be optimized. The arrangements of the beams 100, 101 in the second and third Fourier planes are similar to that shown in FIG. 7 for the first Fourier plane.

FIG. 8 shows a preferred embodiment of the reference beam generator for a one-dimensional array of high-NA half-cone reference beams 101. The 6f lens system contains three telecentric relay lenses 372, 373, 374. Two parts 371/A and 371/B of a special twin diffractive beam generator 371 form half-circle-shaped beams. The upper part 371/A of the special diffractive beam generator 371 diffracts only the positive diffraction orders of the light beam, while it suppresses the zeroth and negative orders. The lower part 371/B diffracts only the negative orders of the light beam, and suppresses the zeroth and positive orders. From the diffracted half-circle-shaped beams the lens 372 forms half-cone-shaped focused beams. In the focal plane of the relay lens 372 there is a phase-modulation SLM 375. The pixels 376 of the phase-SLM 375 retard the phase of the reference half-cones with zero or π radians; this is called phase-coding. The lenses 373 and 374 form the sharp image of the phase SLM 375 in the first Fourier plane. With this reference beam generator an array of reference beams 101 with appropriate phase codes is realized. The distance between the focus spots of the half-cone beams in the first Fourier plane can be adjusted with an appropriate selection of the focal lengths of the lenses 373 and 374.

For scanning reference beam multiplexing a liquid crystal beam deflector can be used instead of the special twin diffractive beam generator 371. The special twin diffractive beam generator 371 in conjunction with the further optics generates an array of high NA half-cone reference beams, while the liquid crystal deflector and the relay lenses 372, 373, 374 generate a single high NA half-cone reference beam at different positions. With the liquid crystal deflector the half-cone tip is moved along the line of the reference beams 101.

Both for the combined phase-coding, shift-multiplexing method, and for the combined scanned-reference beam, shift multiplexing method, an appropriate strategy needs to be developed for hologram stepping in a direction lateral to the surface of the holographic medium 8. This stepping strategy is necessary to avoid overlapping of those neighboring holograms, whose reconstructed object beams are not sufficiently suppressed by Bragg diffraction. Applying additional confocal filtering during the reading process can further increase the number of holograms multiplexed at the same place. In this case even non-orthogonal reference beams could be used if the non-overlapping reconstructed object beams were suppressed with a confocal filter.

Figure 9:
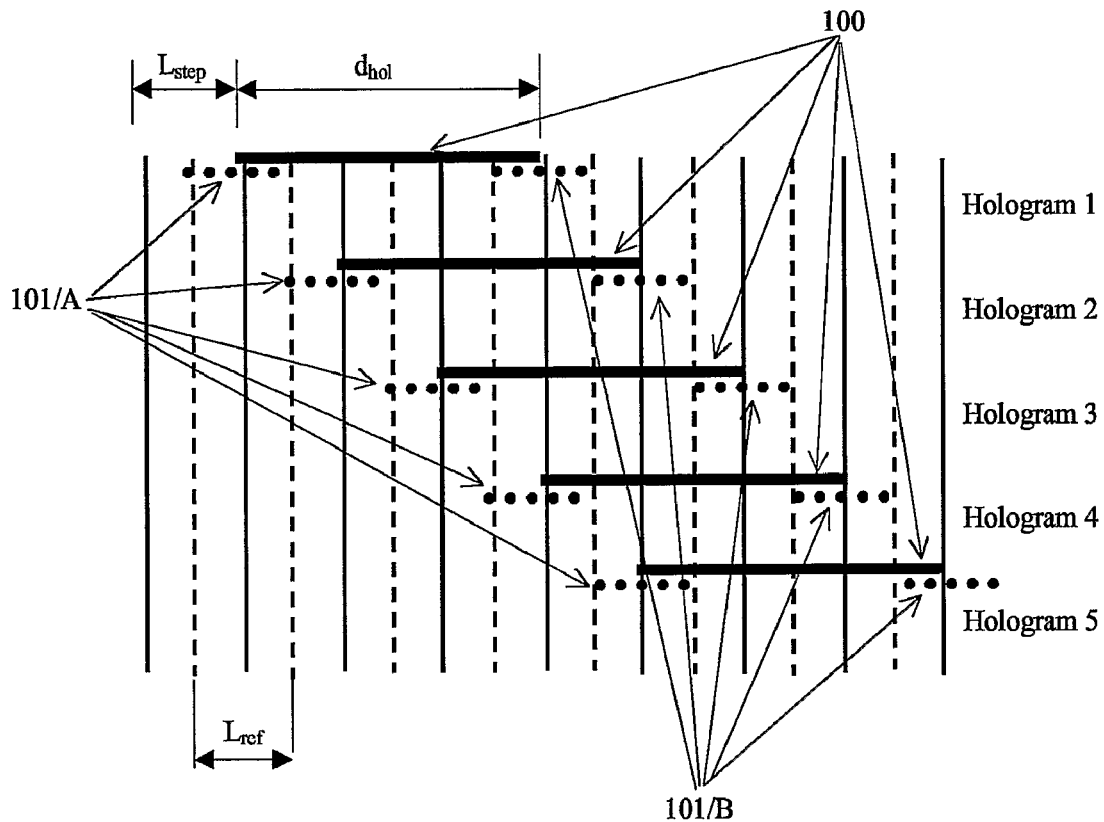
FIG. 9 shows the schematic arrangement of the object and reference beams using combined shift- and phase-coded reference beam multiplexing.

FIG. 9 schematically shows the basic concept of the combined multiplexing method. Thick lines depict the cross section of the Fourier plane of the object beam 100. Dots represent the focal spots of the reference beams 101/A and 101/B in the Fourier plane. In reality, these five sets of lines lie on the same reflective layer 81, i.e. there is no difference in depth between them. In the figure, the five sets are drawn in different depth only for reasons of clarity. The beam diameter in the Fourier plane is $d_{hol}$.

In the figure it is assumed that the hologram lateral stepping length $L_{step}$ is one third of the diameter $d_{hol}$ of the object beam 100 in the Fourier plane. This means that there is a 3-times shift overlap, in other words 3-times shift multiplexing. The reference beams 101/A and 101/B are on two sides of the object beam 100 in the Fourier planes. $L_{ref}$ is the length of the sequence of the reference beam focus spots. This is equal to or less than the stepping length $L_{step}$. The number of possible reference beams over this length depends on the extent of Bragg selectivity. The distance between two adjacent reference spots equals the Bragg distance $L_{Brag}$. The number of reference beams is identical to the number of phase-code multiplexed holograms, which is $N_{PHC}=2(L_{ref}/L_{Brag})$.

There are two alternatives for the arrangement of the reference beams 101/A and 101/B. According to a first solution the reference beams 101/A and 101/B are used in parallel, at the same time. This is the so-called twin reference beam mode. The role of the twin reference beams 101/A and 101/B is to improve the overlap between the object beam 100 and the reference beams 101/A and 101/B. The twin reference beams 101/A and 101/B at the both sides of the object beam 100 have a good overlap with the object beam 100. According to a second solution the reference beams 101/A and 101/B are used independently. At any given time only one of the reference beams 101/A and 101/B is used. With the independent reference beams 101/A and 101/B the number of possible multiplexings can be doubled using confocal filtering during reading.

Generally, for the combined multiplexing method the following equation has to be satisfied: $L_{step} = L_{ref} = d_{hol}/N_{SHT}$, where $N_{SHT}$ is the number of shift multiplexings. From FIG. 9 it is clear that the reference beams of the first three holograms can be written independently of each other. However, the reference beams on the right side of the first hologram overlap with the reference beams on the left side of the fourth hologram. This means that during reading of the first hologram the reference beams on the right side partially reconstruct the fourth hologram as well. With an additional confocal filter light reconstructed from the non-addressed holograms can be filtered out.

Apart from the phase-coded reference beam multiplexing method it is possible to use a scanning reference beam multiplexing method. In this case one reference spot 101 scans through the reference line in the first Fourier plane on the recording Fourier mirror 141, and the reflective layer 81 in the second Fourier plane. The main difference between phase-coded reference beam multiplexing and scanning reference beam multiplexing is the simultaneous or the sequential presence of the reference beam spots 101. In case of scanning reference beam multiplexing, only one reference beam 101 illuminates the holograms at a given time. When the reference beam 101 has scanned through the entire reference line, the holographic medium 8 is moved one step forward. Hence, the scanning reference beam multiplexing method can be combined with the shift multiplexing method as well. By analogy, when using the phase-coded reference beam method in combination with shift multiplexing, the non-addressed but reconstructed holograms need to be confocally filtered out. The positions of the line of reference beams 101 and of the object beam 100 are similar to those shown in FIG. 9. Also the optical layout, the interference fringe geometry, the created sub-holograms etc. are similar to those resulting from the combined scanning and phase-coded reference beam multiplexing.

Figure 11:
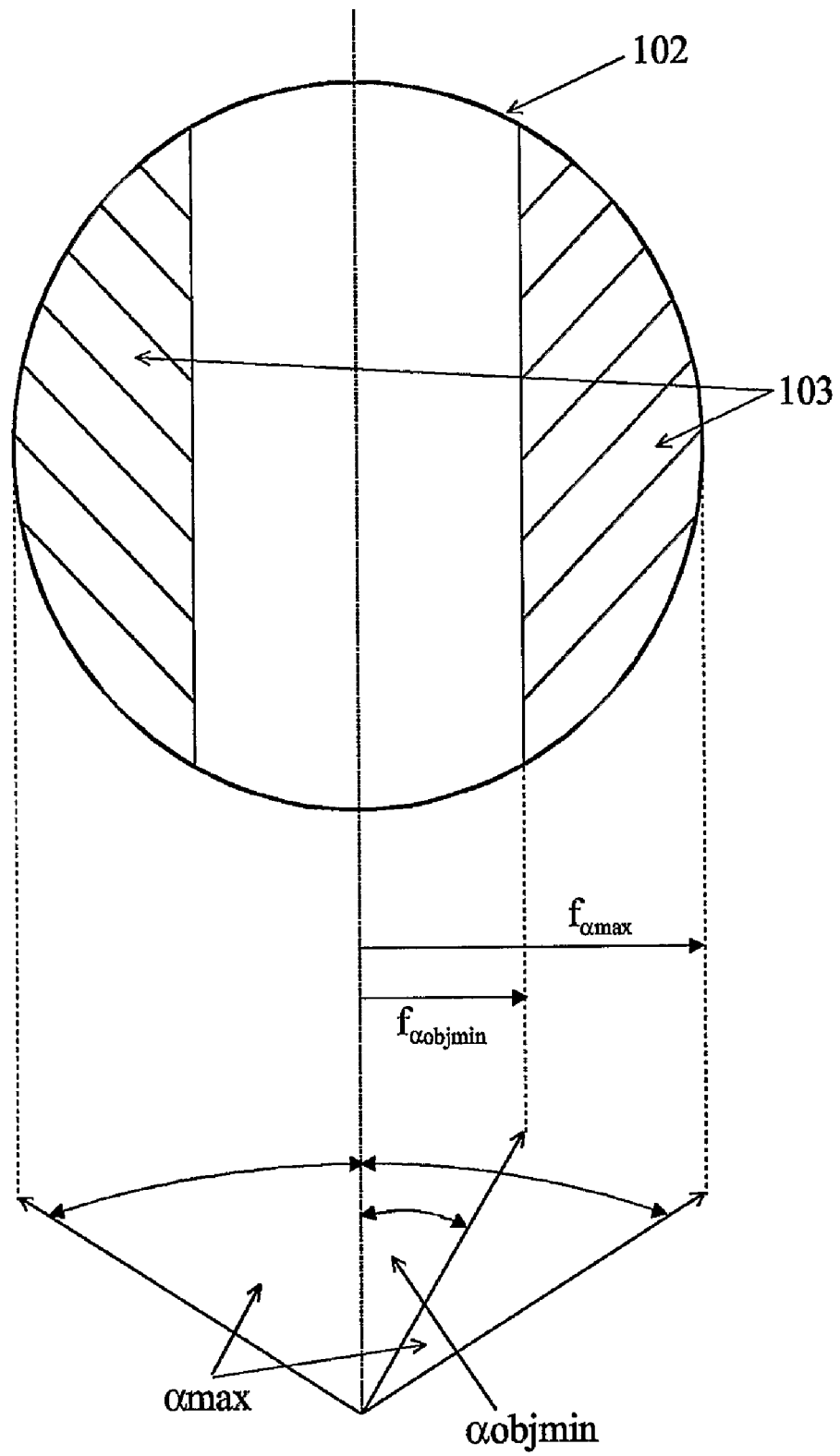
FIG. 11 shows the effective object beam SLM pixels in the object and image planes for the collinear optical system using shift multiplexing.

FIG. 11 shows the position of the object pixels 103 at the object and image planes of the collinear optical systems using shift or phase-coded or scanning reference beam multiplexing, with spherical reference beams 101. There is a prohibited area 104 in the middle of the object space 102 for efficient Bragg selectivity. Crosshatching indicates the areas for the effective object pixels 103 on the right- and left-hand sides. The storage capacity is limited by the maximal angle $\alpha_{max}$ of the Fourier objective. For efficient Bragg selectivity it is necessary to keep a large angle between the reference half-cone axis and the object beams. The minimal angle is $\alpha_{objmin}$. For optimal storage capacity the value of $\alpha_{objmin}$ has to be optimized.

In FIGS. 5 to 9 spherical reference beams were assumed. A spherical reference beam is optimal for shift multiplexing, and can also be used for scanned reference beam and phase-coded reference beam multiplexing, or for their combination.

Figure 12:
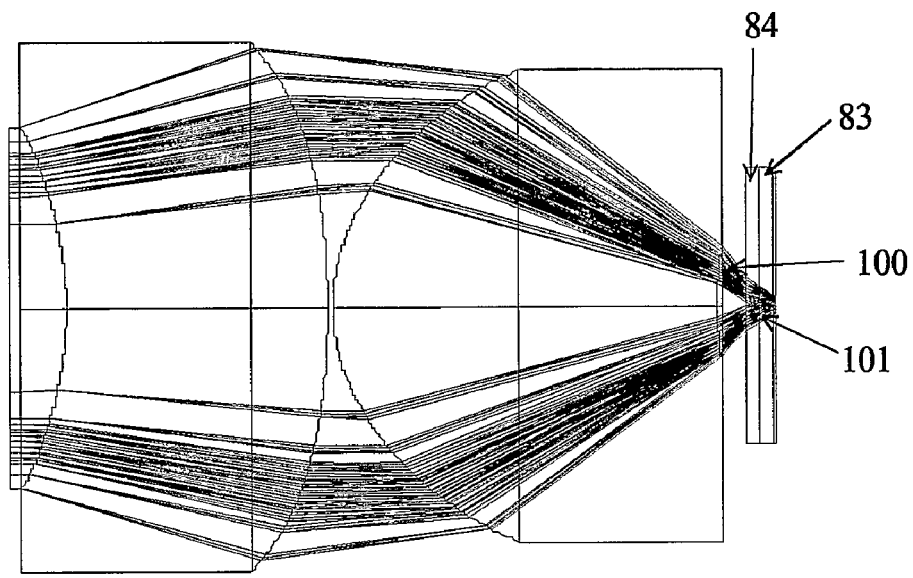
FIG. 12 shows the arrangement for the object and reference plane waves in the case of phase-coded reference beam and/or scanned reference beam multiplexing combined with confocal filtering.
Figure 13:
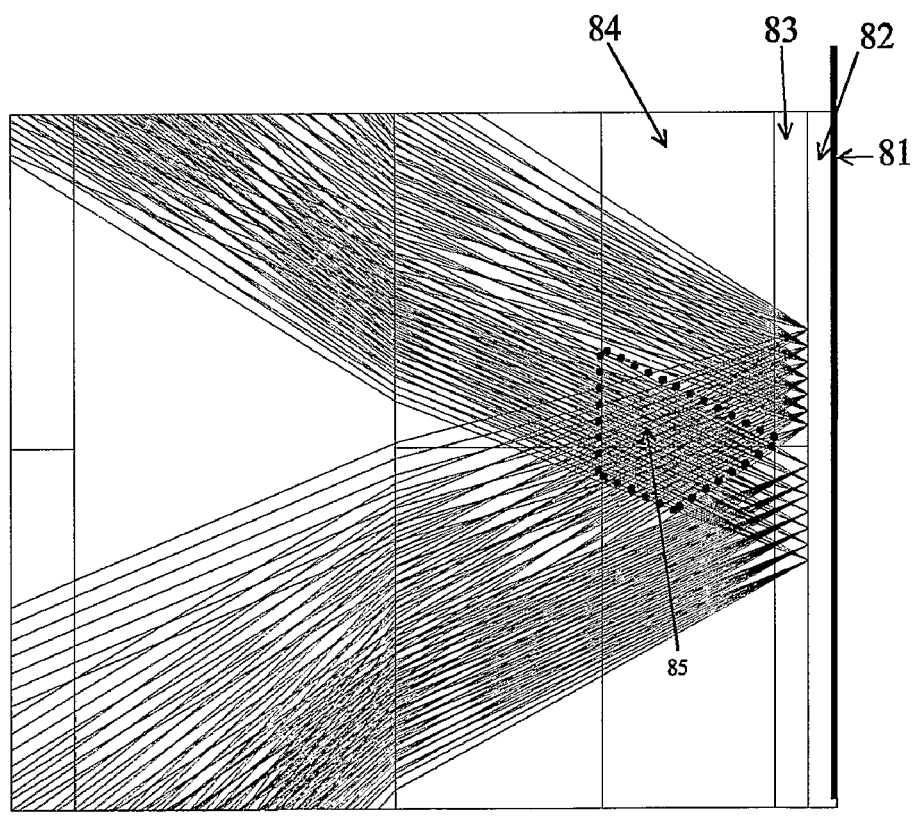
FIG. 13 depicts an enlarged view of the object and reference plane waves for combined multiplexing.

The 12f optical system, with three confocal Fourier planes, is likewise appropriate for recording holograms with plane-wave reference beams 101. Plane reference beams 101 can be coupled-in to and -out of the collinear optical arrangement both at the first Fourier plane and/or at the third Fourier plane. For this purpose, the plane of intersection of the reference beams 101 has to be slightly shifted off the focus spot of the main Fourier component of the object beam 100 in the Fourier planes. If the shift between the beams 100, 101 is large enough, and there is no overlap between the plane of intersection of the reference beams 101 and the Fourier component of the object beam 100, the beams 101 can be coupled-in and -out without significant disturbances. FIG. 12 shows the Fourier objectives with the shifted object beam 100, and the shifted plane reference beams 101. FIG. 13 is the enlarged part of the Fourier plane with shifted beams 100, 101. The exact Fourier plane of the object beam 100 is on the reflective layer 81. Between the storage layer 83 of the holographic medium 8 and the reflective layer 81 is a spacer layer 82. The hologram is formed in the overlap region 85 of the object beam 100 and the reference beams 101, in the storage layer 83. As the three dedicated Fourier planes are in exact object-image relations, at the three Fourier planes the beams have a spatial arrangement similar to that shown in FIGS. 12 and 13, hence the beam shifting is similar in the first and third Fourier planes.

What is claimed is:

1. An apparatus for reading from and/or writing to holographic storage media, with a collinear arrangement of one or more reference beams and an object beam or a reconstructed object beam, having an optical system for recording and/or reading holograms, the optical system being a 12f-system having three pairs of objectives, the first member of each pair of objectives generating the Fourier transform of an object and the second member re-transforming the object, the optical system having three dedicated planes in confocal arrangement, the three dedicated planes being a central and a first and a second outer dedicated plane, said holograms being located near the central dedicated plane, wherein the optical path of the one or more reference beams is combined with the optical path of the object beam at the first outer dedicated plane, and wherein the optical path of the one or more reference beams is separated from the optical path of the reconstructed object beam at the second outer dedicated plane.

2. The apparatus according to claim 1, wherein an SLM for imprinting data page onto the object beam is located in the first focal plane of the first objective pair, and a spatial filter with an aperture which blocks higher order components of the Fourier transform of the SLM is located in the common focal plane of the first objective pair.

3. The apparatus according to claim 1, wherein the first focal plane of the second objective pair coincides with the back focal plane of the first objective pair, the second objective pair being a folded objective, a reflective layer of the holographic medium being located in a common internal Fourier plane of the second objective pair.

4. The apparatus according to claim 1, wherein the first focal plane of the third objective pair coincides with the back focal plane of the second objective pair, in which a spatially filtered readout image of the SLM is located, a spatial filter with an aperture which blocks higher order components of the Fourier transform of the image of the SLM being located in the common focal plane of the third objective pair, and wherein a detector array is located in the back focal plane of the third objective pair.

5. The apparatus according to claim 1, wherein the first objective pair is a folded objective including a polarization beam splitter, a quarter wave plate, a Fourier objective, and a mirror.

6. The apparatus according to claim 1, wherein the third objective pair is a folded objective including a polarization beam splitter, a quarter wave plate, a Fourier objective, and a mirror.

7. The apparatus according to claim 1, wherein the SLM is a transmission or reflection type phase-modulation SLM, and a phase shifting mask for retarding the zeroth diffraction order of the object beam is arranged in the inner focal plane of the third objective pair.

8. The apparatus according to claim 1, including a reference beam generator with special twin diffractive elements and relay optics to create a one dimensional array of half-cone reference beams.

9. The apparatus according to claim 1, including a reference beam generator with a twin liquid crystal beam deflector and relay optics to create a scanning half-cone reference beam.

* * * * *